Figure 1:
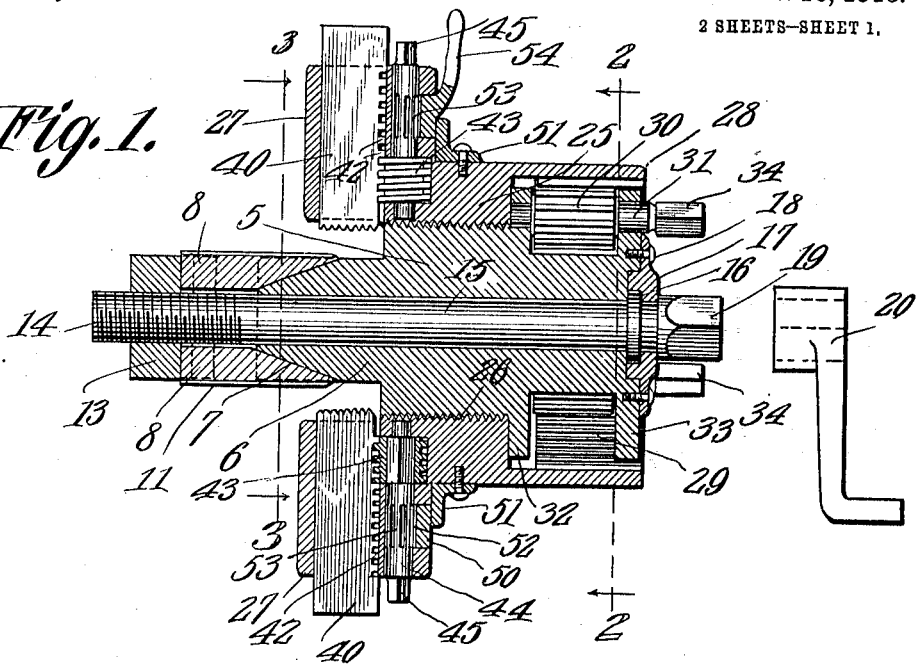

D. DREIER.
PIPE THREADER.
APPLICATION FILED MAY 10, 1911.

1,053,482.

Patented Feb. 18, 1913.

2 SHEETS—SHEET 1.

Witnesses

Dominick Dreier
Inventor,
by C. A. Snow & Co.
Attorneys.

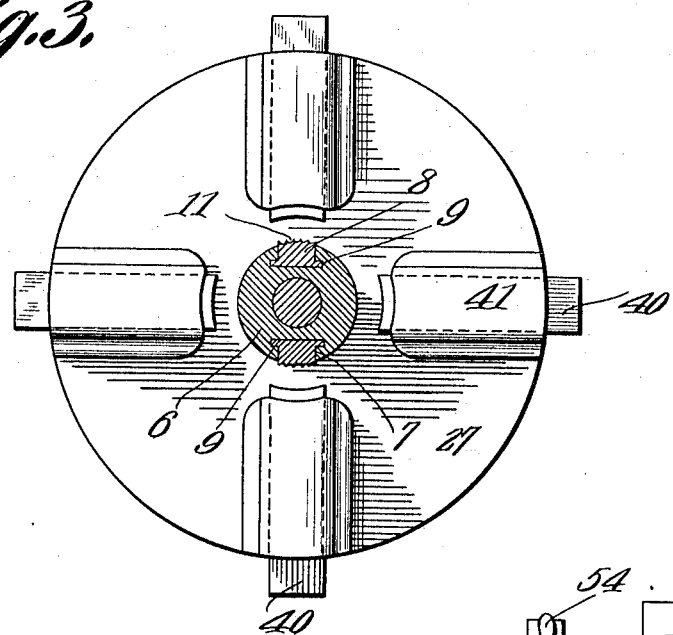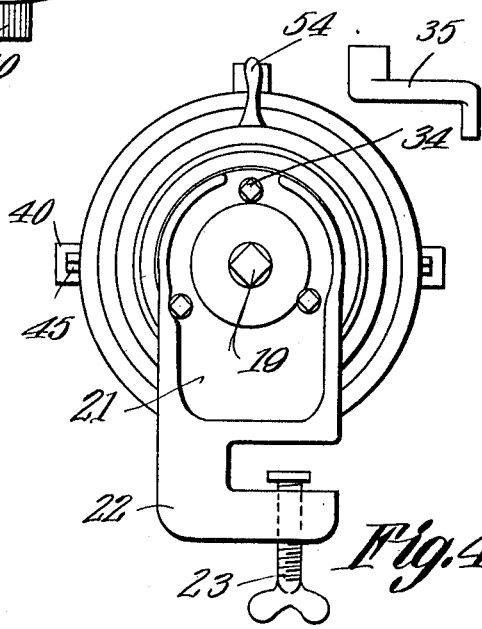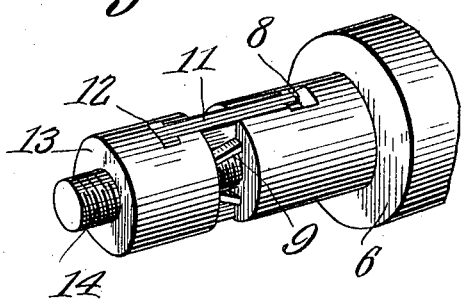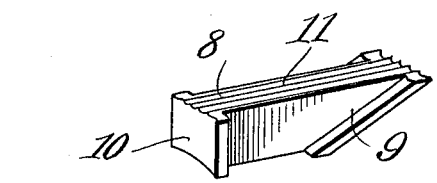

UNITED STATES PATENT OFFICE.

DOMINICK DREIER, OF LIVINGSTON, MONTANA.

PIPE-THREADER.

1,053,482.   Specification of Letters Patent.   Patented Feb. 18, 1913.

Application filed May 10, 1911. Serial No. 626,327.

*To all whom it may concern:*

Be it known that I, DOMINICK DREIER, a citizen of the United States, residing at Livingston, in the county of Park and State of Montana, have invented a new and useful Pipe-Threader, of which the following is a specification.

This invention relates to screw threading, and more especially, to devices for cutting external threads on the ends of sections of pipes; and the object of the same is to produce an implement or machine having certain novel features of construction as set forth in the following specification and claims, and as shown in the drawings wherein—

Figure 2:
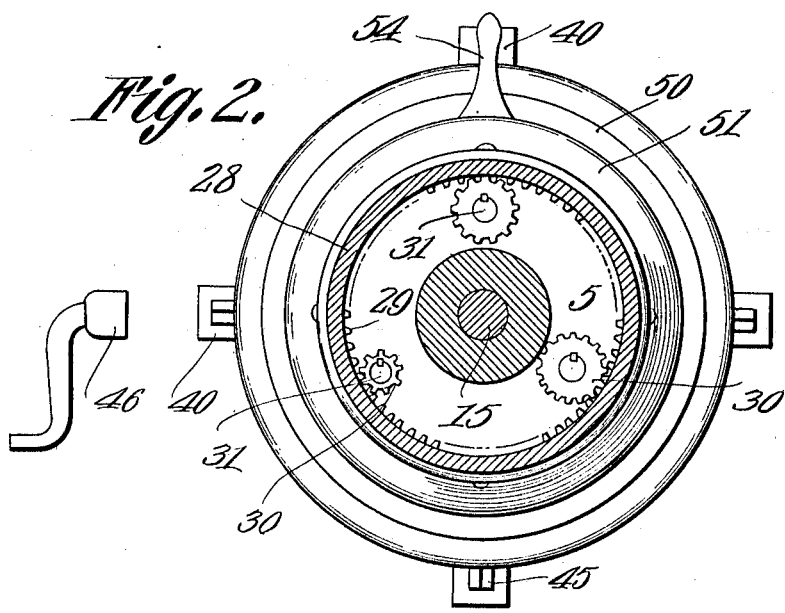

Figure 1 is a central longitudinal section. Fig. 2, is a cross section on the line 2—2 of Fig. 1. Fig. 3, is a cross section on the line 3—3 of Fig. 1. Fig. 4, is an end elevation looking from the right hand of Fig. 1 and showing the crank handles as slightly removed from the places where they are to be applied. Fig. 5, is an enlarged perspective detail of the work holder. Fig. 6, is a perspective detail of one of the dogs.

In the drawings I have shown an implement in Figs. 1, 2 and 3 and a machine in Fig. 4, but the difference lies mainly in the fact that the former is intended for manual application to the end of a pipe which is to be threaded and manual rotation of the parts which are to do the work; whereas the machine is shown as including a standard or clamp which is to be attached to a work bench or suitable support, and it is also to include connections with a source of power which will drive the rotating parts, and the pipe to be threaded will in this instance be brought to the machine in a manner which will be understood. The principle is the same in both cases, and the implement or machine includes a work holder and the thread cutting mechanism. In the machine the work holder is connected with the fixed support and therefore the thread cutting mechanism must rotate, but with an implement it is clear that so long as either part turns with respect to the other the end desired will be accomplished. The parts of this device are of course all of metal and of the desired sizes, shapes, proportions and specific construction except as hereinafter set forth; and I reserve to myself the privilege of making such changes as come within the spirit of this invention.

Coming now more particularly to a specific description of parts, the work holder includes a tubular body 5 whose front end 6 is reduced in size and provided with a plurality of undercut grooves 7 which converge toward the axis toward its front end. In the drawings two such grooves are shown, and there might be more, but there should not be less than two. In each groove moves a substantially triangular dog 8 whose oblique inner end is flanged as at 9 so as to engage the groove reliably and whose outer end 10 is also flanged and stands at right angles to its radially outer face 11 which is corrugated. The flanges of the outer ends of these dogs engage radial undercut grooves 12 in a nut 13 whose exterior is cylindrical and of about the size of the reduced portion 6, and whose interior is threaded and engages an adjusting screw 14 whose shank 15 extends loosely through the bore of the body 5 as seen in Fig. 1 and has a collar 16 near its rear end.

The numeral 17 designates a flange secured as by screws 18 to the rear extremity of the body and engaging the collar 16, by which means the screw is removably and rotatably held in position. The rear extremity of this screw is squared as at 19 so that a wrench 20 or suitable implement can be engaged therewith to turn the screw. Obviously its rotation with reference to the body 5 causes the advance or recession of the nut 13, and either movement of the latter will cause the flanged inner ends 9 of the dogs 8 to travel in the oblique grooves 7 so that their outer faces 11 will be projected radially outward within a pipe or be retracted radially inward to release a pipe. As before mentioned, there must be at least two of these dogs, although it might be better to have three or possibly four. Substantially the same form of work holder is employed when this implement becomes a machine as seen in Fig. 4 which illustrates merely a bracket 21 connected with the rear end of the body 5 and mounted upon a suitable support as by means of a clamp 22 and screws 23. In this case, however, the body never rotates and therefore the pipe to be worked upon will be held stationary by the work holder just described.

The die head has a cylindrical body portion 25 internally threaded as at 26 to engage threads on the exterior of the body 5 above described, a radially-projecting die-holding flange or portion 27 at its outer end, a shell 28 at its inner end, and an internal ring of teeth 29 within said shell. These teeth engage rather long gears 30 (of which three are shown in Fig. 2, of varying sizes) and each gear is fast on a shaft 31 whose inner extremities finds a bearing in a flange 32 around the body 5 next the threads thereon, while at the outer end of the gear the shaft passes through another flange 33 on the body 5 and its extremity 34 is squared for the reception of a wrench 35 as shown slightly removed in Fig. 4. It will be clear that by applying this wrench to the squared extremity 34 of one of these shafts, and rotating it, its gear engaging the teeth 29 will cause the shell 28 and the entire die head to rotate, and the threaded connection 26 between said head and the body 5 will therefore cause the die head to advance or recede upon the body, according to which way the wrench is turned. As the head moves, its teeth 29 slide along those in the several gears 30, and the fact that the latter are neatly mounted in bearings in the flanges 32 and 33 of the body causes them to act as roller bearings to rigidly support the inner end of the die head and assist in resisting any strains that are thrown upon it. Obviously if this device is built in the form of a machine and the body 5 remains stationary, the several squared ends 34 will be disposed around its center as seen in Fig. 4 and the wrench 35 must be applied to that one which it is desired to rotate; and the selection will be made by the speed of rotation it is desired to impart, which in turn is to be decided by the speed with which it is desired to feed the dies forward.

The dies themselves may be of any approved pattern, and duplicates of each other or not as preferred, but each die 40 will be mounted between parallel guides 41 on the die holding flange 27 so as to be movable radially toward and from the axis of the machine, and will have oblique teeth 42 across its inner edge which engage a worm wheel 43 whose shaft 44 is journaled radially in the flange 27 and squared at its outer end as at 45 for the reception of a wrench 46. Obviously the turning of this wrench in the proper direction will set the die 40 inward or outward as desired.

The numeral 50 designates a ring surrounding the die head and mounted for circumferential movement around it behind a flange 51, and this ring has teeth 52 engaging other teeth 53 on the shafts 44 of the various worm wheels 43. The ring itself has a handle 54 as seen in Fig. 1, and it is obvious that when this handle is moved in the proper direction the various shafts 44 will be turned simultaneously and their worm wheels 43 will cause the simultaneous movement of the various dies 40 outward from or inward toward the axis of the machine. When this ring is in place and its teeth engaged with those on the several shafts, it will be clear that if any one shaft is turned by a wrench 46 its rotary movement is communicated through the ring to all the other shafts, although when the ring is out of place or its teeth out of engagement with those on the shafts the latter can be set individually.

This machine is intended for cutting exterior threads on sections of pipe, no matter what their length, and for that reason it is useful particularly for threading short lengths or sections of pipe which hitherto have been wasted. The pipe is inserted over the left end of the work holder shown in Fig. 1, and by turning the wrench 20 on the squared end 19 so that the shaft 16 will be rotated in the proper direction, the several dogs 8 are moved simultaneously and radially outward so as to expand within the end of the pipe and hold it tightly in place. If this device be an implement it is brought to the pipe while the latter lies on the bench or is held in a vise, but if this device be a machine the pipe is brought to it and is held by it at one end while the remote end of the pipe is supported in any suitable manner. The proper dies for cutting the threads are then selected and passed into the various die holders, the teeth 42 of each die engaging the worm 43 in a manner which will be clear. If the ring 50 is in place, as soon as each die has been engaged with its worm the ring can be turned to move them all simultaneously inward until the die faces contact with the exterior of the pipe to be cut. Then the wrench 35 is placed upon one of the squared ends 34 (that one being selected which gives the proper speed of rotation to the die head) and turned, and the result is that the entire head with all its dies rotates around the body 5 and the work holder and work. If the device be an implement the wrench 35 will be turned by hand, but if the device be a machine this rotation may be effected through belting or gearing in a manner not necessary to illustrate and describe. From time to time the handle 54 is moved in the proper direction to cause the ring to turn the various shafts 44 so that their worms 43 will set the dies 40 a little further inward, and the cutting faces of the dies therefore cut deeper and deeper into the pipe until the thread is finished thereon in a manner well known to those skilled in this art. If this device be an implement the handle 54 will be moved manually, but if it be a machine there may be mechanical means provided to advance the handle a little at each rotation of the head. After the thread has been cut, the ring 53 is turned in a reverse direction to move all the dies 40 outward, and then the shaft 15 is turned in the reverse direction to move the dogs 8 inward and release the work, so that the machine is ready for operation upon another section of pipe.

What is claimed is:

1. In a pipe threading machine, the combination with a rotary head, and the cutting dies carried thereby and having their active faces directed inward; of a work holder comprising a tubular body extending axially through said head and having in its front end a plurality of undercut converging grooves, a nut having at its inner end an equal number of undercut radial grooves, a series of dogs having their ends shaped and flanged to fit said grooves respectively, a screw passing through the bore of the body and engaging said nut, and means for turning the screw in either direction.

2. In a pipe threading machine, the combination with a rotary head, and the cutting dies carried thereby and having their active faces directed inward; of a work holder comprising a tubular body extending axially through said head and having in its front end a plurality of under converging grooves, a nut having at its inner end an equal number of undercut radial grooves, a series of dogs having their ends shaped and flanged to fit said grooves respectively and their outer faces corrugated, a screw passing through the bore of the body and engaging said nut, a collar fast on the screw and resting against the rear end of the body, a flange detachably connected with the latter and embracing said collar, the rear extremity of the shaft being squared and a wrench removably applied thereto, for the purpose set forth.

3. In a pipe threading machine, the combination with an externally threaded body having spaced radial flanges near its rear end, a work holder at its front end, a series of gears of different sizes, each having its shaft journaled in said flanges so that the outer sides of the gears shall be equi-distant from the axis of the head, the outer extremities of said shafts being squared, and a wrench for application to any of them; of the die head having a cylindrical body internally threaded to engage the threads on said fixed body and having a shell at its rear end with an internal ring of teeth engaging the teeth on said gears, the dies carried by the front end of this head, and means for setting them.

4. In a pipe threading machine, the combination with an externally threaded body having spaced radial flanges near its rear end, a work holder at its front end, a series of gears of different size, each having its shaft journaled in said flanges so that the outer sides of the gears shall be equi-distant from the axis of the head, the outer extremities of said shafts being squared, and a wrench for application to any of them; of the die head having a cylindrical body internally threaded to engage the threads on said fixed body and having a shell at its rear end with an internal ring of teeth engaging the teeth on said gears, a die-holding flange at the front end of said head projecting radially outward therefrom, a second flange removably fastened around the head in rear of the other, a ring movable adjacent this flange, guides on the die-holding flange, dies movable radially in said guides, and connections between the dies and ring whereby the rotation of the latter on the head sets all the dies simultaneously.

In testimony that I claim the foregoing as my own, I have hereto affixed my signature in the presence of two witnesses.

DOMINICK DREIER.

Witnesses:
E. M. NILES,
R. R. BROWN.

Copies of this patent may be obtained for five cents each, by addressing the " Commissioner of Patents, Washington, D. C."